(12) United States Patent
Bohori et al.

(10) Patent No.: US 8,552,595 B2
(45) Date of Patent: Oct. 8, 2013

(54) SYSTEM AND METHOD FOR CONTACTLESS POWER TRANSFER IN PORTABLE IMAGE DETECTORS

(75) Inventors: Adnan Kutubuddin Bohori, Bangalore (IN); Suma Memana Narayana Bhat, Bangalore (IN); Somakumar Ramachandrapanicker, Bangalore (IN); Jeffrey Neal Slotnick, Sayville, NY (US)

(73) Assignee: General Electric Company, Niskayuna, NY (US)

( * ) Notice: Subject to any disclaimer, the term of this patent is extended or adjusted under 35 U.S.C. 154(b) by 157 days.

(21) Appl. No.: 13/149,170

(22) Filed: May 31, 2011

(65) Prior Publication Data

US 2012/0306281 A1 Dec. 6, 2012

(51) Int. Cl.
 H01F 27/42 (2006.01)
 H01F 37/00 (2006.01)
 H01F 38/00 (2006.01)

(52) U.S. Cl.
 USPC .......................................................... 307/104

(58) Field of Classification Search
 USPC ......................................... 307/104; 320/108
 See application file for complete search history.

(56) References Cited

U.S. PATENT DOCUMENTS

| 5,690,693 | A | 11/1997 | Wang et al. |
| 6,960,968 | B2 | 11/2005 | Odendaal et al. |
| 7,323,964 | B1 | 1/2008 | Shyu et al. |
| 7,433,655 | B2 | 10/2008 | Jacobs et al. |
| 7,471,986 | B2 | 12/2008 | Hatlestad |
| 2008/0240358 | A1 | 10/2008 | Utschig et al. |
| 2008/0265684 | A1 | 10/2008 | Farkas |
| 2008/0312852 | A1 | 12/2008 | Maack |
| 2010/0308939 | A1* | 12/2010 | Kurs .......................... 333/219.2 |

FOREIGN PATENT DOCUMENTS

| JP | 2009106136 A | 5/2009 |
| WO | 2007008646 A2 | 1/2007 |

OTHER PUBLICATIONS

Adnan Bohori et al.;Title : Contactless Power Transfer System; U.S. Appl. No. 12/845,133, filed Apr. 28, 2011; 24 Pages.
Adnan Bohori et al.; Title : Contactless Power Transfer System; U.S. Appl. No. 12/845,133, filed Jul. 28, 2010; 34 Pages.
Adnan Bohori et al.; Title : Power Transfer System and Method; U.S. Appl. No. 12/822,232, filed Jun. 24, 2010; 19 Pages.
Stephen Paul Fenton et al.; Title : Electrical Coupling Apparatus and Method; U.S. Appl. No. 12/778,475, filed May 12, 2010; 12 Pages.
Adnan Bohori et al.; Title : Contactless Power Transfer System; U.S. Appl. No. 12/820,208, filed Jun. 22, 2010; 18 Pages.

(Continued)

*Primary Examiner* — Carlos Amaya
(74) *Attorney, Agent, or Firm* — Ann M. Agosti

(57) ABSTRACT

A system and method for contactless power transfer in a portable image detector for charging rechargeable batteries disposed within the portable image detector is provided. The system includes a first coil couplable to a power source, wherein the first coil is configured to produce a magnetic field. The system further includes a second coil coupled to the rechargeable battery disposed within the portable image detector and configured to receive power from the first coil via the magnetic field and to transfer the power to the rechargeable battery. The system also includes a field focusing element disposed between the first coil and the second coil and configured as a self resonant coil having a standing wave current distribution to focus the magnetic field onto the second coil and enhance the coupling between the first coil and the second coil.

17 Claims, 5 Drawing Sheets

(56) References Cited

OTHER PUBLICATIONS

Adnan Bohori et al.; Title : Systems for Contactless Power Transfer; U.S. Appl. No. 12/914,512, filed Oct. 28, 2010; 17 Pages.

Adnan Bohori et al.; Title : Contactless Power Transfer System and Method; U.S. Appl. No. 12/731,497, filed Mar. 25, 2010; 27 Pages.

Adnan Bohori et al.; Title : System and Method for Contactless Power Transfer in Implantable Devices; U.S. Appl. No. 13/052,196, filed Mar. 21, 2011; 21 Pages.

Aristeidis Karalis, J.D. Joannopoulos, Marin Soljac; Title : Efficient wireless non-radiative mid-range energy transfer; Annals of Physics 323 (2008) 34-48.

* cited by examiner

SYSTEM AND METHOD FOR CONTACTLESS POWER TRANSFER IN PORTABLE IMAGE DETECTORS

BACKGROUND

Embodiments of the present invention relate generally to contactless power transfer systems and more particularly to systems for contactless power transfer in portable image detectors.

Typically, imaging devices are used for the purpose of medical diagnostics. The imaging devices include an image detector that is used to detect the image for diagnostic purposes. The image detectors are either fixed or portable image detectors. The portable image detectors operate on batteries, which may comprise non-rechargeable or rechargeable batteries.

Non-rechargeable batteries typically are replaced after a fixed period of time. Generally, rechargeable batteries are used to extend the time between battery replacements and are cost effective. Conventionally, rechargeable batteries are recharged by an inductive coupling system that operates at frequencies measured in kilohertz. The operating frequency of the inductive coupling system generates electromagnetic waves sufficient to affect the image detector and degrade quality of the image by introducing artifacts in the images.

There is a need for an improved system and method for battery charging.

BRIEF DESCRIPTION

In one embodiment, a system for contactless power transfer in a portable image detector for charging a rechargeable battery disposed within the portable image detector is provided. The system includes a first coil couplable to a power source, wherein the first coil is configured to produce a magnetic field. The system further includes a second coil coupled to the rechargeable battery disposed within the portable image detector and configured to receive power from the first coil via the magnetic field and to transfer the power to the rechargeable battery. The system also includes a field focusing element disposed between the first coil and the second coil and configured as a self resonant coil having a standing wave current distribution to focus the magnetic field onto the second coil and enhance the coupling between the first coil and the second coil.

In another embodiment, a method for contactless charging of a rechargeable battery disposed in a portable image detector is provided. The method includes generating a magnetic field via a first coil coupled to a power source. The method further includes focusing the magnetic field to a second coil via a field-focusing element. The method also includes transferring power from the first coil to the second coil via the magnetic field. The method further includes transmitting the power from the second coil to the rechargeable battery disposed within the portable image detector.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include a system for contactless power transfer in a portable image detector for charging a rechargeable battery disposed within the portable image detector. The system includes a first coil couplable to a power source. The first coil produces a magnetic field that is coupled to a second coil coupled to the rechargeable battery disposed within the portable image detector. The second coil receives the power from the first coil via the magnetic field and further transfers the power to the rechargeable battery. The contactless power transfer system also includes a field-focusing element that is disposed between the first coil and the second coil. The field-focusing element acts as a self-resonant coil having a standing wave current distribution to focus the magnetic field onto the second coil and enhances the coupling between the first coil and the second coil. As used herein, the terms "a" and "an" do not denote a limitation of quantity, but rather denote the presence of at least one of the referenced item. As used herein, "coupled" means connected by any appropriate means, whether directly or indirectly.

Figure 1:
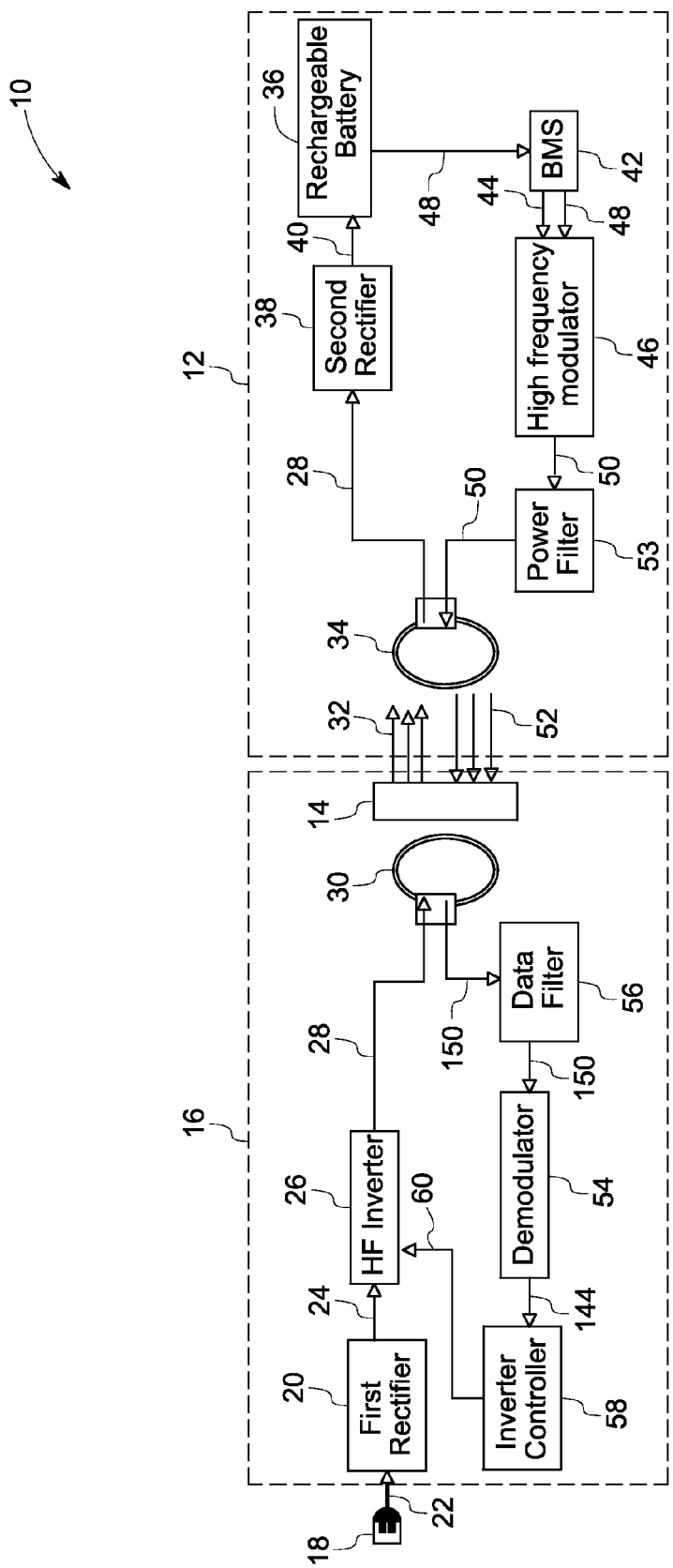
FIG. 1 is a block diagram representation of a system for contactless power transfer in a portable image detector including a two channel field-focusing element in accordance with an embodiment of the invention.

FIG. 1 is a block diagram representation of a system 10 for contactless power transfer in portable image detector 12 including a two channel field-focusing element 14 in accordance with an embodiment of the invention. In an exemplary embodiment, the portable image detector 12 may include an X-ray image detector or an ultrasound scanner. The system 10 further includes a charging device 16. The charging device 16 includes a docking station in one example.

In the embodiment shown in FIG. 1, a power source 18 is coupled to a first rectifier 20 of the charging device 16 that converts AC power 22 received from the power source 18 to DC power 24. The DC power 24 provided by the first rectifier 20 is supplied to a high frequency inverter 26. The high frequency inverter 26 converts the DC power 24 to high frequency AC power 28. The high frequency AC power 28 is further transmitted to a first coil 30 provided in the charging device 16. The first coil 30 receives the high frequency AC power 28 and generates a magnetic field 32 based on the high frequency AC power 28. The charging device 16 may comprise a stationary charging device or a portable charging device.

The magnetic field 32 is focused onto a second coil 34 provided in the portable image detector 12 via a field-focusing element 14 disposed between the first coil 30 and the second coil 34. In the embodiment of FIG. 1, the field-focusing element 14 is situated within the charging device 16. In another embodiment, the field-focusing element 14 may be disposed within the portable image detector. In a particular embodiment, the field focusing element operates at a frequency above or equal to 1 megahertz. The field-focusing element 14 acts as a self-resonant coil having a standing wave current distribution to focus the magnetic field 32 onto the second coil 34 and enhances the coupling between the first coil 30 and the second coil 34 as described in commonly assigned U.S. patent application Ser. No. 12/731,497, filed on Mar. 25, 2010 and Ser. No. 12/914,512, filed on Oct. 28, 2010, which are hereby incorporated by reference in their entirety. In one embodiment, the field-focusing element 14 includes at least one resonator. The at least one resonator may be configured to focus at least one of an electric field, a magnetic field, or an electromagnetic field. In a more specific embodiment, the at least one resonator includes a split ring structure, a circular loop structure, a helical structure, a Koch fractal, an omega structure, or a spiral structure. In an exemplary embodiment, the at least one resonator is disposed within at least one of a dielectric medium, a magnetic medium, or a magneto-dielectric medium. Furthermore, in a particular embodiment, the at least one resonator includes a plurality of resonators with at least two of the plurality of resonators having different resonant frequencies. In one embodiment, the different resonant frequencies enable transfer of power and data signals simultaneously.

The second coil 34 disposed within the portable image detector 12, receives the high frequency AC power 28 from the first coil 30 via the magnetic field 32 generated by the first coil 30. The second coil 34 transfers the high frequency AC power 28 to the rechargeable battery 36 coupled to the second coil 34 within the portable image detector 12. A second rectifier 38 may be disposed between the second coil 34 and the rechargeable battery 36 to receive the high frequency AC power 28 from the second coil 34 and convert the AC power 28 to DC power 40 before transferring the DC power 40 to the rechargeable battery 36. In one embodiment, the DC power 40 transferred to the rechargeable battery 36 is within a range of about 1 watt to about 100 watts. The range of DC power 40 transferred to the rechargeable battery varies based on the type of operating condition of the portable image detector 12 such as whether the power will be used for charging the portable image detector, or whether the power will be used both for charging the portable image detector and simultaneously providing power for imaging operation. Furthermore, the DC power 40 required for operating also varies based on the detector configuration.

In the embodiment of FIG. 1, the rechargeable battery 36 is coupled to a battery management system (BMS) 42 that manages the charging of the rechargeable battery 36. In one embodiment, the BMS 42 tracks signals 48 representative of the power levels in the rechargeable battery 36 and calculates the power and time required to charge the rechargeable battery 36. In another embodiment, the BMS 42 regulates a voltage of the DC power 40 entering the rechargeable battery 36. In some embodiments, the BMS 42 communicates with the high frequency inverter 26 disposed within the charging device 16 to provide data 44 related to the voltage and charge level of the rechargeable battery 36.

The BMS 42 is communicatively coupled to a high frequency modulator 46 that receives the data signals 44 generated by the BMS 42 and modulates the data signals 44 to provide modulated data signals 50. The high frequency modulator 46 is coupled to the second coil 34. The second coil 34 converts the modulated data signals 50 to a data magnetic field 52 that is focused on the first coil 30 via the field-focusing element 14. In this embodiment, the field-focusing element 14 includes a two channel field-focusing element including one channel to transfer the AC power 28 and a second channel to transfer the modulated data signals 50. A power filter 53 may be disposed between the second coil 34 and the high frequency modulator 46 to isolate the high frequency AC power 28 received from the first coil 30 from the high frequency modulator 46.

The first coil 30 receives the data magnetic field 52 and transfers signals 150 which are representative of the modulated data signals 50 to a demodulator 54. A power filter 56 at the charging device 16 may be used to restrict the high frequency AC power 28 within the first coil 30 from entering the demodulator 54. The demodulator 54 extracts signals 144 representative of the data signals 44 from the modulated data signals 150 and transfers the data signals 144 to an inverter controller 58. The inverter controller 58 controls the voltage and frequency of power at which the high frequency inverter 26 operates in the charging device 16 by providing control signals 60 based on the data signals 144. The inverter controller 58 identifies the voltage and the charge status from the data signals 144 and regulates the inverter operation accordingly to provide desired charging to the rechargeable battery 36.

Figure 2:
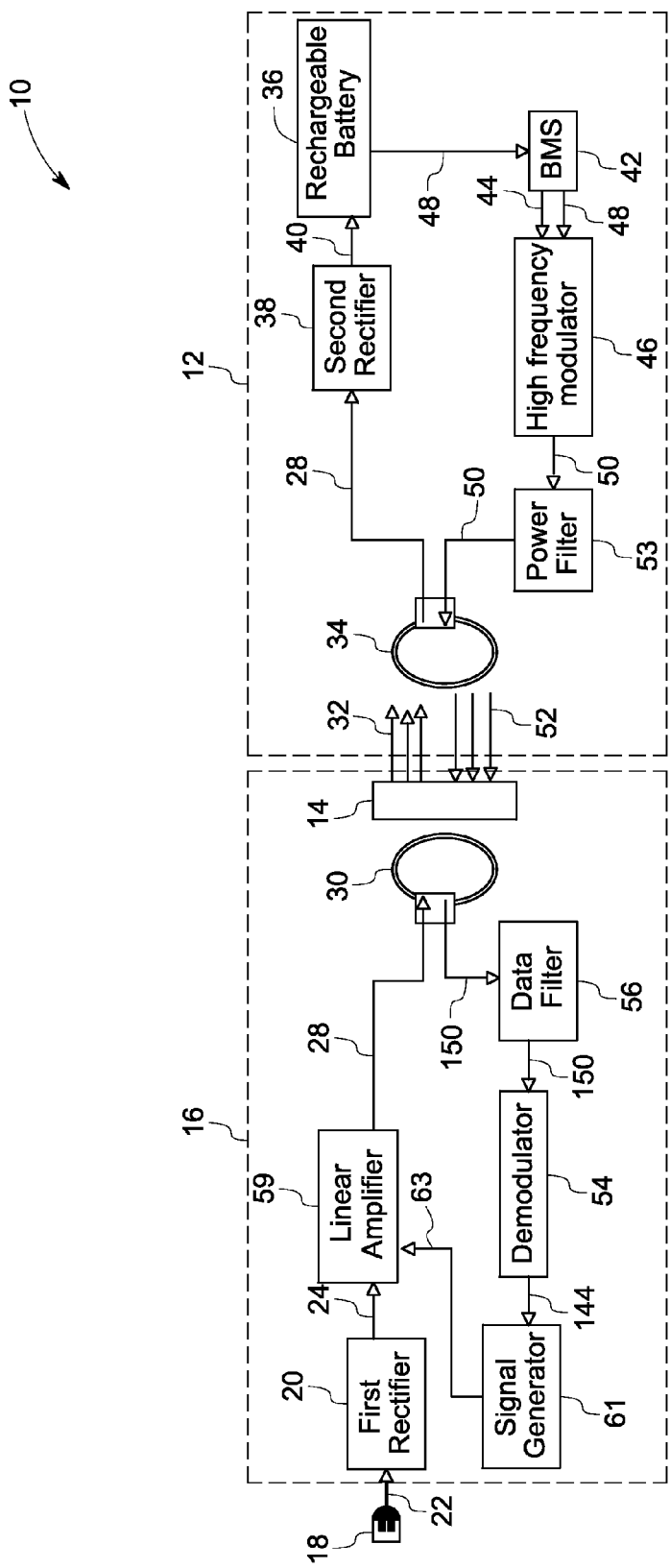
FIG. 2 is a block diagram representation of an alternate configuration of a system for contactless power transfer in a portable image detector including a two channel field-focusing element in accordance with an embodiment of the invention.

FIG. 2 is a block diagram representation of an alternate configuration of the system 10 for contactless power transfer in a portable image detector 12 including the two channel field-focusing element 14 coupled to the first coil 30 in accordance with an embodiment of the invention. In the specific embodiment of FIG. 2, the high frequency inverter 26 and controller 58 are replaced with a linear amplifier 59 and a signal generator 61. The signal generator 61 includes a high frequency oscillator that generates high frequency sine waves 63 and transfers the same to the linear amplifier 59. The linear amplifier 59 combines the high frequency sine waves 63 provided by the signal generator 61 with the DC power 24 provided by the first rectifier 20 to provide the high frequency AC power 28.

Figure 3:
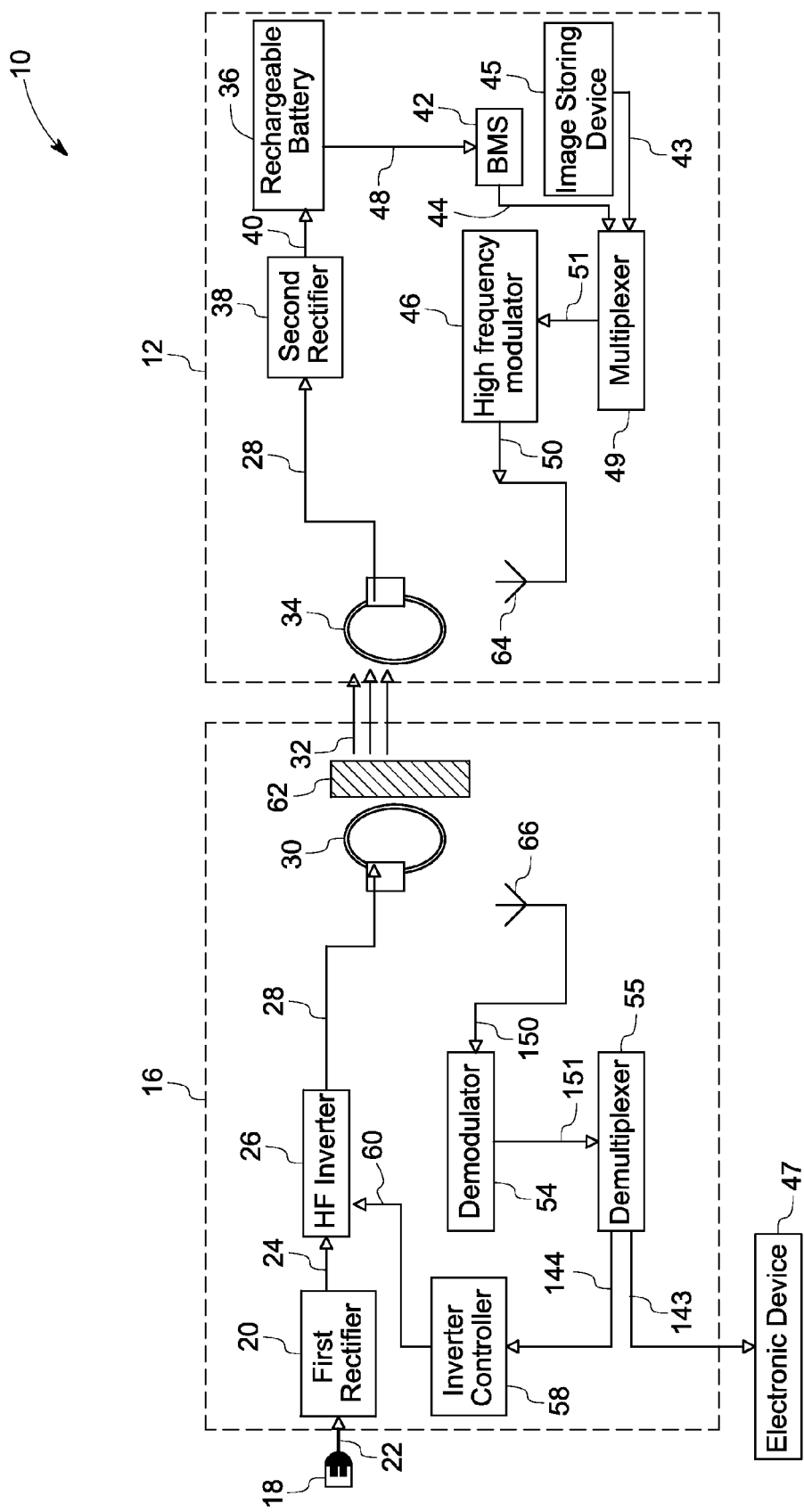
FIG. 3 is a block diagram representation of another alternate configuration of the system for contactless power transfer in a portable image detector including a single channel field focusing element and a radio wave antenna configured to transfer digital image data from the portable image detector to an electronic device in accordance with an embodiment of the invention.

FIG. 3 is a block diagram representation of another alternate configuration of the system 10 for contactless power transfer in a portable image detector 12 including a single channel field focusing element 62 and radio frequency antennas 64 and 66 configured to transfer data signals 44 from battery management system 42 and, if desired, image data 43 from an image storing device 45 in accordance with an embodiment of the invention. In this embodiment, the portable image detector 12 includes the image storing device 45 that stores an image data 43 generated for diagnostic purposes. The image data 43 may be used by an electronic device 47 for further analysis such as, for example, detecting diseases and pathological study of the skeletal system. In one embodiment, the image storing device 45 transfers the image data 43 to a multiplexer 49 that multiplexes the image data 43 along with the data signals 44 transferred by the BMS 42 to the multiplexer 49. The multiplexer 49 generates a multiplexed signal 51 that is transferred to the high frequency modulator 46 for modulation. The single channel field-focusing element 62 focuses high frequency AC power 28 from the first coil 30 to the second coil 34 but, in contrast to the embodiments of FIGS. 1 and 2, the single channel field-focusing element 62 does not transfer modulated data signals from the second coil 34 to the first coil 30. Although the single channel field-focusing element 62 is shown as being situated in the portable image detector 12, the single channel field-focusing element 62 may alternatively be situated in the charging device 16.

In the embodiment of FIG. 3, the modulated data signals 50 received from the high frequency modulator 46 may be transferred to a RF transmitter antenna 64 disposed within the portable image detector 12. The RF transmitter antenna 64 transmits the modulated data signals 50 to a RF receiver antenna 66 disposed within the charging device 16. The RF receiver antenna 66 receives the modulated data signals 150 representative of the modulated data signals 50 from the portable image detector 12 and transfers the modulated data signals 150 to the demodulator 54.

The demodulator 54 demodulates the modulated data signals 150 and transfers the same to a de-multiplexer 55. The de-multiplexer 55 separates the image data 143 and the data signals 144 from the multiplexed signal 151 representative of the image data 43 and the data signals 44 in the portable image detector 12 respectively. The data signals 144 are transferred to the inverter controller 58 as described above, and the image data 143 may be transferred to the electronic device 47 provided outside the charging device 16 for further analysis.

Figure 4:
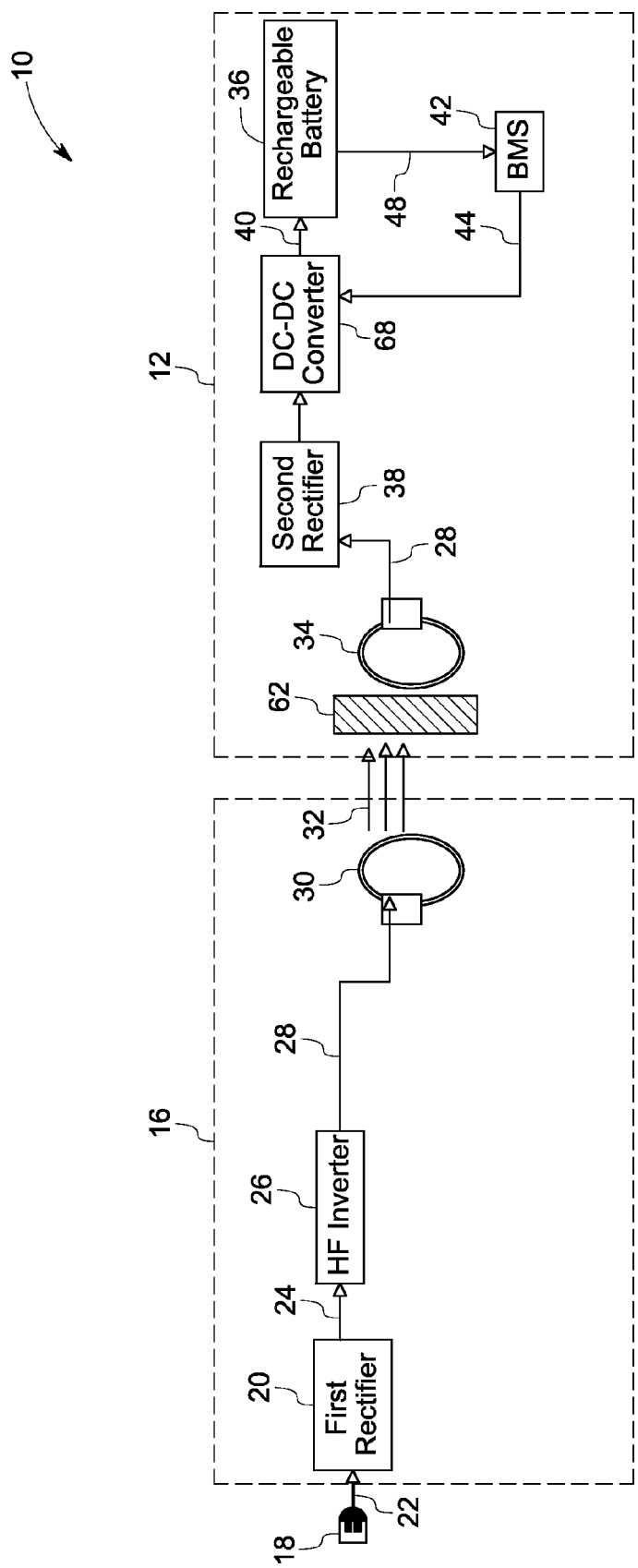
FIG. 4 is a block diagram representation of an alternate configuration of a system for contactless power transfer in a portable image detector including a single channel field-focusing element in accordance with another embodiment of the invention.

FIG. 4 is a block diagram representation an alternate configuration of the system 10 for contactless power transfer in the portable image detector 12 wherein no data is required to be transmitted back to the charging device 16. The system 10 includes the single channel field-focusing element 62 to focus high frequency AC power 28 from the first coil 30 to the second coil 34. Although the single channel field-focusing element 62 is shown as being situated in the charging device, the single channel field-focusing element 62 may alternatively be situated in the portable image detector 12. The high frequency AC power 28 from second coil 34 is converted to DC power by the second rectifier 38, which is transferred to a DC-DC converter 68, which provides DC power 40. The DC power 40 is fed to the rechargeable battery 36 for charging. The rechargeable battery 36 is coupled to the BMS 42 that regulates the charging of the rechargeable battery 36. In the embodiment of FIG. 4, the BMS 42 is coupled to the DC-DC converter 68 via a feedback loop to regulate the voltage of the DC power 40 entering the rechargeable battery 36 in the portable image detector 12. The DC-DC converter 68 receives the data signals 44 from the BMS 42 via the feedback loop and adjusts accordingly to provide optimum charging to the rechargeable battery 36.

Figure 5:
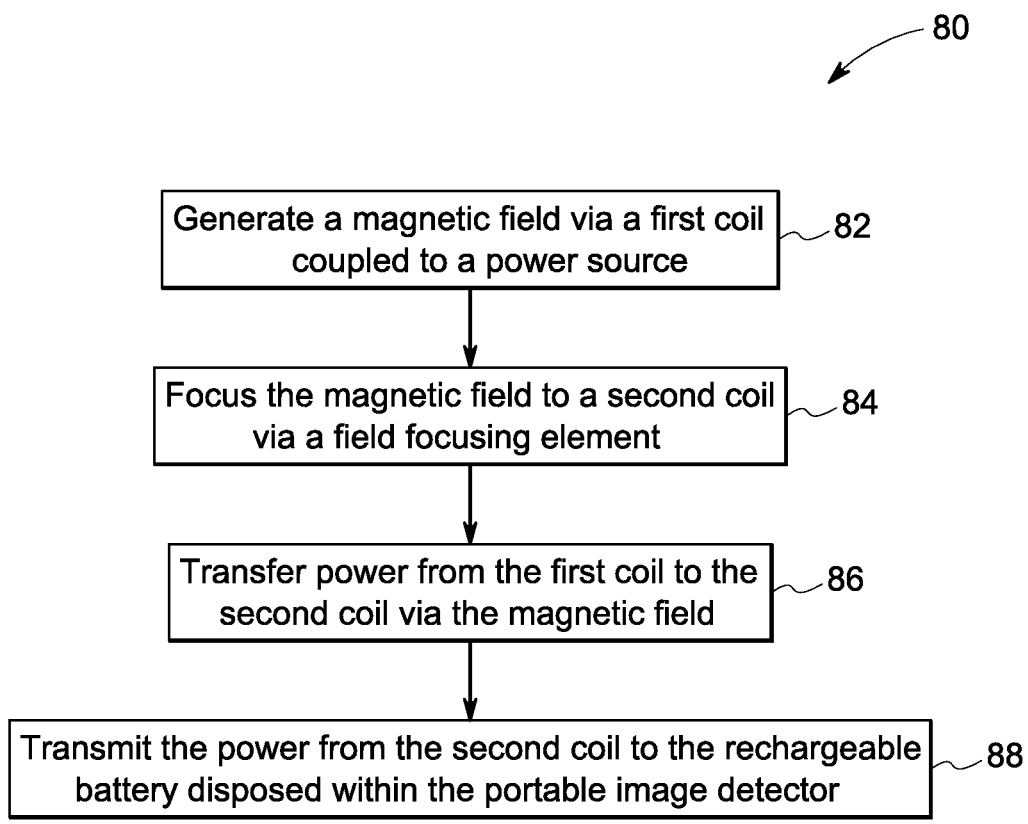
FIG. 5 is a flow chart representing the steps involved in a method for contactless charging of a rechargeable battery disposed in a portable image detector in accordance with an embodiment of the invention.

FIG. 5 is a flow chart representing the steps involved in a method 80 for contactless charging of a rechargeable battery disposed in a portable image detector in accordance with an embodiment of the invention. The method 80 includes generating a magnetic field via a first coil coupled to a power source in step 82. The magnetic field generated by the first coil is focused to a second coil by employing a field-focusing element in step 84. The first coil transfers power to the second coil via the magnetic field in step 86. In an exemplary embodiment, the power is transferred from the first coil to the second coil within a range of about 1 watt to about 100 watts. The power from the second coil is transmitted to the rechargeable battery disposed within the portable image detector in step 88. In one embodiment, data signals regarding the portable image detector, the state of charge of the rechargeable battery, or both are obtained and transferred through the field-focusing element, first coil and the second coil to a processor situated outside of the portable image detector. In another embodiment, an image data is obtained from an image storing device in the portable image detector and transferred through the field focusing element. In a more specific embodiment, the process is facilitated by having the power, the data signals and the image data from the rechargeable battery and portable image detector respectively transferred at different resonant frequencies. In still other embodiments, data transfer either is not required or is accomplished via RF transmission.

The various embodiments of the systems for contactless power transfer in portable image detector described above include a power source, a first coil, a field focusing element and a second coil that enable transfer of power via a contactless medium from the first coil to the second coil. The contactless power transfer system enables efficient contactless power transfer between the charging device and the image detector without damaging the image detector and the quality of image. This reduces the degradation of the image leading to better efficiency and increased life of the portable image detector further reducing cost of maintenance of the portable image detector.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for contactless power transfer in a portable image detector for charging a rechargeable battery disposed within the portable image detector comprising:
    a first coil couplable to a power source, wherein the first coil is configured to produce a magnetic field;
    a second coil coupled to the rechargeable battery disposed within the portable image detector and configured to receive power from the first coil via the magnetic field and to transfer the power to the rechargeable battery; and
    a field focusing element disposed between the first coil and the second coil and configured as a self resonant coil having a standing wave current distribution to focus the magnetic field onto the second coil and enhance the coupling between the first coil and the second coil, wherein the field focusing element comprises a plurality of resonators with at least two of the plurality of resonators having different resonant frequencies.

2. The system of claim 1, wherein the field focusing element is disposed within a charging device.

3. The system of claim 1, wherein the field focusing element is disposed within the portable image detector.

4. The system of claim 1, wherein the portable image detector comprises an X-ray image detector or an ultrasound scanner.

5. The system of claim 1, wherein the power transferred to the rechargeable battery is within a range of about 1 watt to about 100 watts.

6. The system of claim 1, wherein the field focusing element operates at a frequency above or equal to 1 megahertz.

7. The system of claim 1, further comprising a high frequency inverter or a linear amplifier coupled between the power source and the first coil.

8. The system of claim 1, wherein the plurality of resonators are disposed within at least one of a dielectric medium, a magnetic medium, or a magneto-dielectric medium.

9. The system of claim 1, wherein the different resonant frequencies are configured to enable transfer of power and data signals.

10. The system of claim 1, wherein the plurality of resonators are configured to focus at least one of an electric field, a magnetic field, or an electromagnetic field.

11. A method for contactless charging of a rechargeable battery disposed in a portable image detector comprising:
    generating a magnetic field via a first coil coupled to a power source;
    focusing the magnetic field to a second coil via a field focusing element, wherein the field focusing element comprises a plurality of resonators with at least two of the plurality of resonators having different resonant frequencies;
    transferring power from the first coil to the second coil via the magnetic field; and
    transmitting the power from the second coil to the rechargeable battery disposed within the portable image detector.

12. The method of claim 11, wherein transferring the power from the first coil to the second coil comprises transferring the power within a range of about 1 watt to about 100 watts.

13. The method of claim 11, further comprising, focusing the magnetic field via a field focusing element operating at a frequency above or equal to 1 megahertz.

14. The method of claim 11, further comprising obtaining data signals regarding the portable image detector, the state of charge of the rechargeable battery, or both, and transferring the data signals to a processor situated outside of the portable image detector.

15. The method of claim 14, wherein the transferring of the data signals further comprising transferring the power to the rechargeable battery and the data signals from the portable image detector at different resonant frequencies.

16. The method of claim 14, further comprising using the data signals to control the magnetic field generated by the first coil.

17. The method of claim 11, further comprising obtaining data signals regarding the portable image detector, the state of charge of the rechargeable battery, or both, and using the data signals to control the power transmitted from the second coil to the rechargeable battery.

* * * * *